United States Patent [19]
Shimamoto et al.

[11] Patent Number: 6,005,617
[45] Date of Patent: Dec. 21, 1999

[54] ELECTRONIC CAMERA WITH MECHANICAL SUBSCANNER

[75] Inventors: Takeshi Shimamoto, Hirakata; Yoshihiro Yokoyama, Takatsuki, both of Japan

[73] Assignee: Matsushita Electric Industrial Co., Ltd., Osaka-fu, Japan

[21] Appl. No.: 08/813,188

[22] Filed: Mar. 10, 1997

[30] Foreign Application Priority Data

Mar. 11, 1996 [JP] Japan ................................. 8-052771

[51] Int. Cl.⁶ ........................................... H04N 3/14
[52] U.S. Cl. ........................ 348/295; 348/311; 348/316; 348/312
[58] Field of Search ................................. 348/295, 294, 348/311, 312, 316, 374, 337, 336, 280, 144, 145

[56] References Cited

U.S. PATENT DOCUMENTS

| | | | |
|---|---|---|---|
| 4,227,206 | 10/1980 | Nagumo ................................. | 348/238 |
| 4,280,141 | 7/1981 | McCann et al. ........................ | 348/295 |
| 4,687,944 | 8/1987 | Mitsuka et al. ........................ | 348/337 |
| 4,882,619 | 11/1989 | Hasegawa et al. ..................... | 348/337 |
| 5,048,101 | 9/1991 | Kurosu et al. ......................... | 382/305 |
| 5,227,888 | 7/1993 | Haga ..................................... | 348/207 |
| 5,454,102 | 9/1995 | Yokoyama et al. .................... | 358/426 |
| 5,838,373 | 11/1998 | Hasewaga et al. ..................... | 348/312 |

FOREIGN PATENT DOCUMENTS

| | | | |
|---|---|---|---|
| 0 680 203 A2 | 2/1995 | European Pat. Off. . | |
| 0 666 686 A2 | 8/1995 | European Pat. Off. . | |
| 0666686A2 | 8/1995 | European Pat. Off. ......... | H04N 3/15 |
| 068203A2 | 11/1995 | European Pat. Off. ......... | H04N 3/08 |

*Primary Examiner*—Wendy Garber
*Assistant Examiner*—Carramah J. Quiett
*Attorney, Agent, or Firm*—Wenderoth, Lind & Ponack, L.L.P.

[57] ABSTRACT

Using a common area sensor to build a high resolution electronic camera requires a large sensor chip with an incumbent high cost. Using a line sensor results in slow imaging and therefore limited applications. An electronic camera using a small sensor chip with high speed imaging is therefore provided. A two-dimensional imaging device that is narrower than an area sensor subscans the imaging plane of the lens system by means of a scanning device. The charge transfer register of the two-dimensional imaging device is driven by an X clock generator in the opposite direction and at the same speed as the subscanning speed, thereby achieving TDI operation and high speed image capturing.

34 Claims, 11 Drawing Sheets

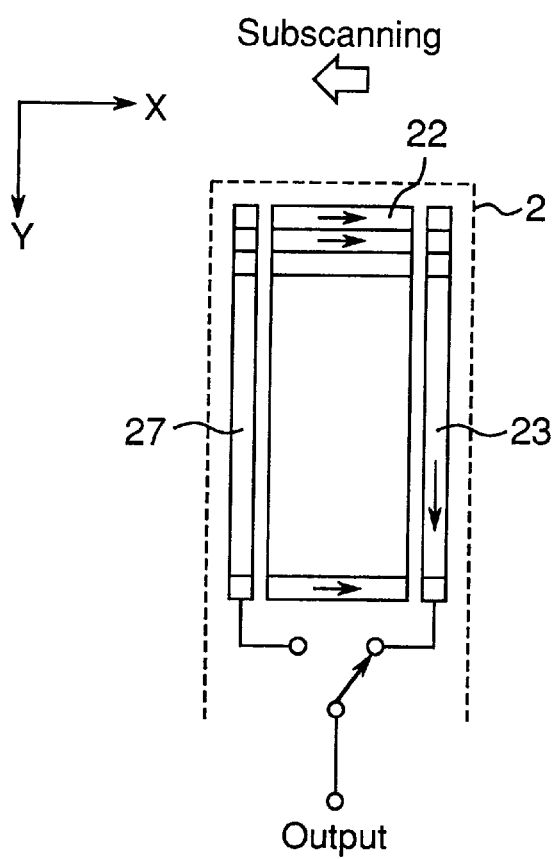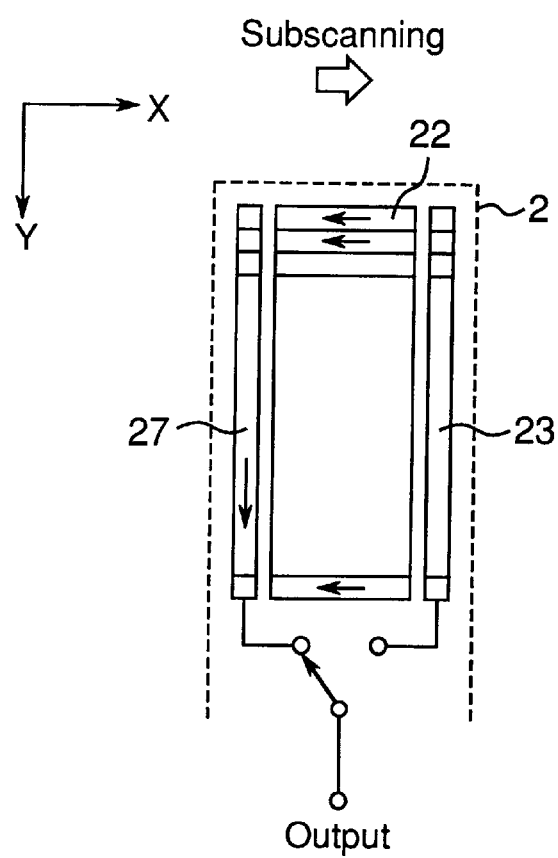

ELECTRONIC CAMERA WITH MECHANICAL SUBSCANNER

BACKGROUND OF THE INVENTION

1. Field of the Invention

The invention relates to an electronic camera for forming images by mechanically scanning an imaging device.

2. Description of the Prior Art

Imaging methods used by conventional still-camera type image input devices include the common method using a two-dimensional imaging device (commonly called an "area sensor"), and methods whereby a two-dimensional image is obtained by mechanically scanning an image using a one-dimensional imaging device (commonly called a "line sensor") as disclosed in Japanese laid-open (tokkai) patent number H5-316302.

An area sensor 60 with an imaging area of H pixels by V pixels is shown in FIG. 11, and a V-pixel long line sensor 61 which is driven in the direction of the arrow to subscan H pixels wide to image an area of H pixels by V pixels is shown in FIG. 12. If the per-pixel sensitivity of these sensors is equal, the line sensor requires an imaging time of H times that of the area sensor due to the charge storage time in order to achieve the same sensitivity. On the other hand, the line sensor has 1/H as many pixels as the area sensor, can therefore be achieved with a smaller sensor chip, and is thus used in image input devices having a large pixel count.

In one specialized image input method an image moving continuously across an area sensor is obtained by a time-delay integration (TDI) operation. Examples of devices using this TDI operation are disclosed in U.S. Pat. No. 4,740,681, an apparatus for capturing images of stars that are moving due to the rotation of the imaging satellite, and U.S. Pat. No. 4,922,337, an apparatus for capturing images of objects moving at a constant rate on a conveyor as shown in FIG. 13.

Referring to FIG. 13, a subject 38 on a conveyor 37 moving at a constant rate of speed is imaged by a camera 36 comprising a lens 35 and an area sensor 31. The area sensor 31 executes a TDI operation synchronized to the output of a tachometer 39 detecting the speed of the conveyor 37 to capture a still image of the subject 38.

What is common to each of the above-described apparatuses is that images are captured of subjects moving at a constant speed in a constant direction relative to a camera comprising a sensor that is in a fixed position relative to the lens. There are no examples in the literature of methods using this TDI operation compatible with conventional cameras used to capture images of common, indeterminately-moving subjects.

Using an area sensor to construct a high resolution camera such as an HDTV camera having more than two-million pixels requires a large-scale chip, resulting in an extremely high cost. Camera-type scanners using a line sensor are widely available, but require a per-image scanning time of many seconds. As a result such scanners are limited to applications in which the camera is fixed on a stand and used to capture still subjects.

SUMMARY OF THE INVENTION

The object of the present invention is therefore to resolve the above-noted problems by providing a high resolution electronic camera that is capable of capturing images of common subjects from a hand-held position with an exposure time of less than one of several tenths of a second using a sensor chip that is sufficiently smaller than that of an area sensor.

To achieve this object, an electronic camera according to the invention comprises a lens system for forming an image of the subject, a charge-transfer type two-dimensional (X, Y) imaging device, a scanning means for subscanning the imaging device in the opposite-X direction over the imaging plane of the lens system at a constant speed for at least the period from when the leading edge of the imaging device receptor enters the imaging area of the imaging plane until the trailing edge of the receptor leaves said imaging area, an X clock generator for transferring the photoelectric charges of the imaging device at the same speed as subscanning and parallel to the X direction, a Y clock generator for serially transferring in the Y direction the charge collected at the X end of the imaging device, and an image signal circuit for processing the Y-direction output of the imaging device.

BRIEF DESCRIPTION OF THE DRAWINGS

The present invention will become more fully understood from the detailed description given below and the accompanying diagrams, wherein:

FIGS. 10A and 10B are diagrams showing a bidirectional subscanning operation of an alternative embodiment of the invention.

DESCRIPTION OF THE PREFERRED EMBODIMENTS

The preferred embodiments of the present invention are described below with reference to the accompanying FIG. 1 to FIG. 10.

Figure 1:
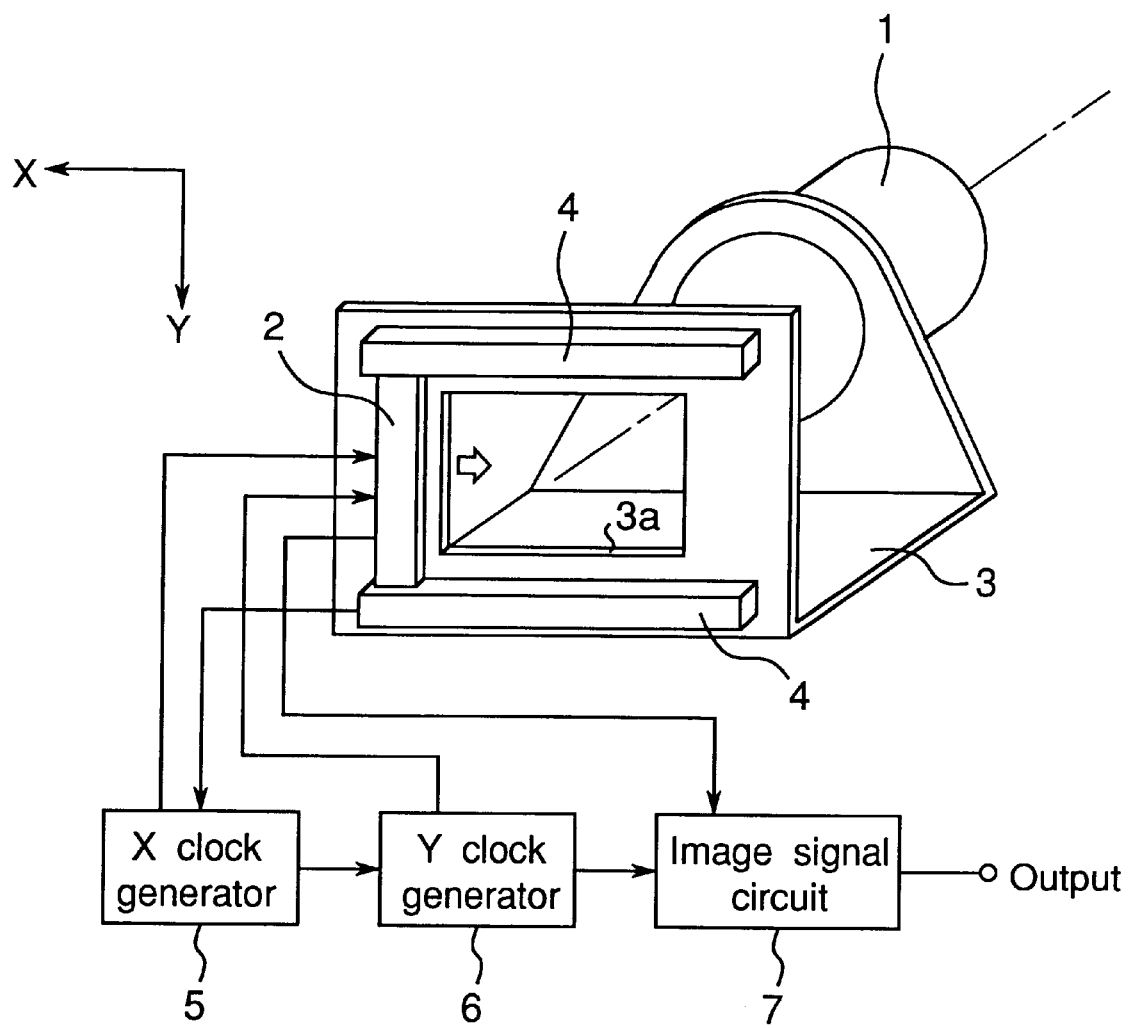
FIG. 1 is a basic configuration diagram of a still camera according to the invention.

FIG. 1 is a basic overview of a electronic camera according to the invention. As shown in FIG. 1, a charge-transfer type two-dimensional imaging device 2 is provided at the imaging plane of the lens system 1, and is driven in the direction of the arrow by the scanning device 4 fixed to camera chassis 3 to subscan the imaging plane 3a defined by an opening formed in the camera chassis. The imaging plane 3a has a size capable of covering H pixels aligned horizontally and V pixels aligned vertically. According to the preferred embodiment, H=1920 and V=1080.

Figure 4:
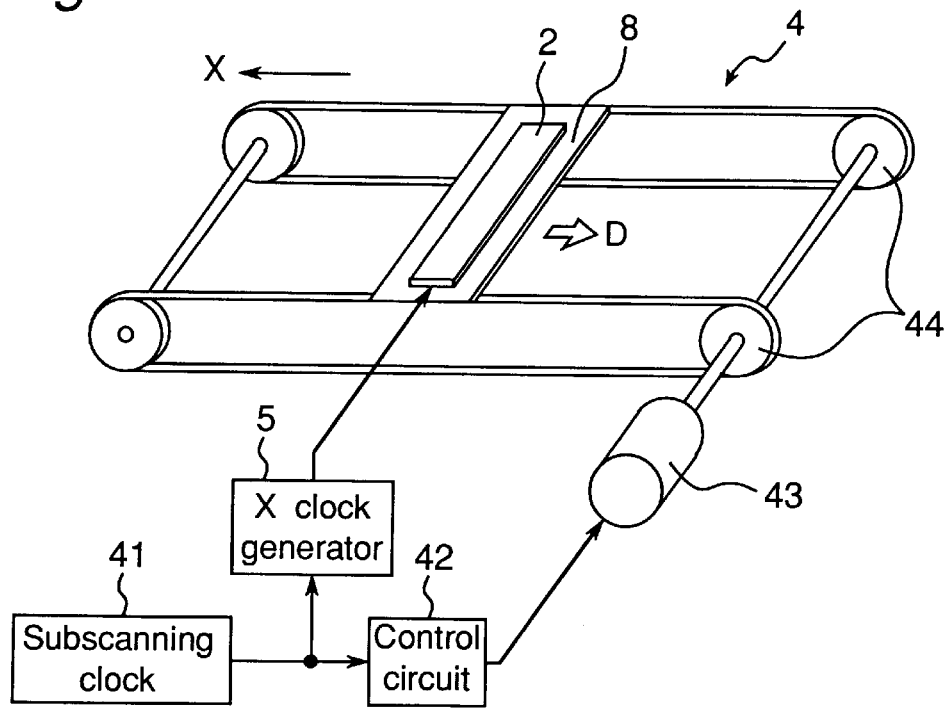
FIG. 4 is a diagram of a scanning device in one embodiment of the invention.
Figure 5:
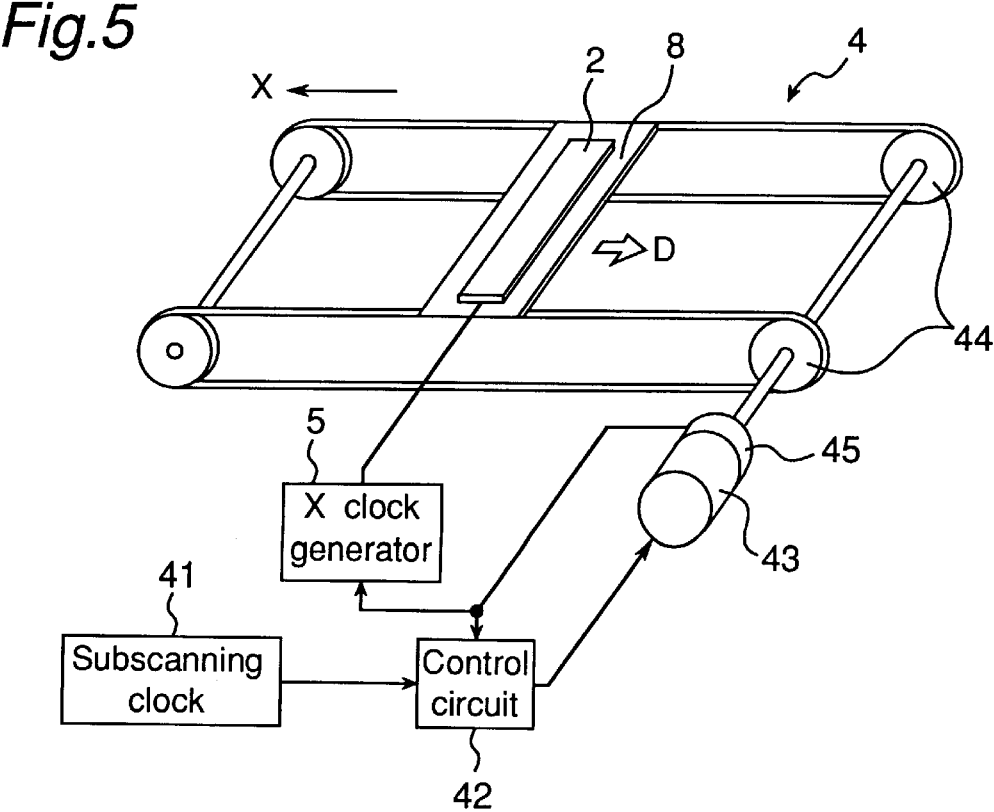
FIG. 5 is a block diagram of a scanning device in another embodiment of the invention.

The scanning device 4 comprises, noting FIG. 5, a motor 43, linear slide mechanism 44, position detector 45, subscanning clock 41 and control circuit 42. A detail of the scanning device 4 will be described later in connection with FIG. 4.

An X clock generator 5 supplies the X clock enabling TDI operation in parallel to the imaging device 2, and a Y clock generator 6 (see FIG. 6A, e.g.) supplies a Y clock to the imaging device 2 causing the imaging device 2 to serially output the image signal. The image signal circuit 7 applies various common signal processing operations, such as amplification and compensation, to the image signal to generate the output signal of the camera.

Figure 2:
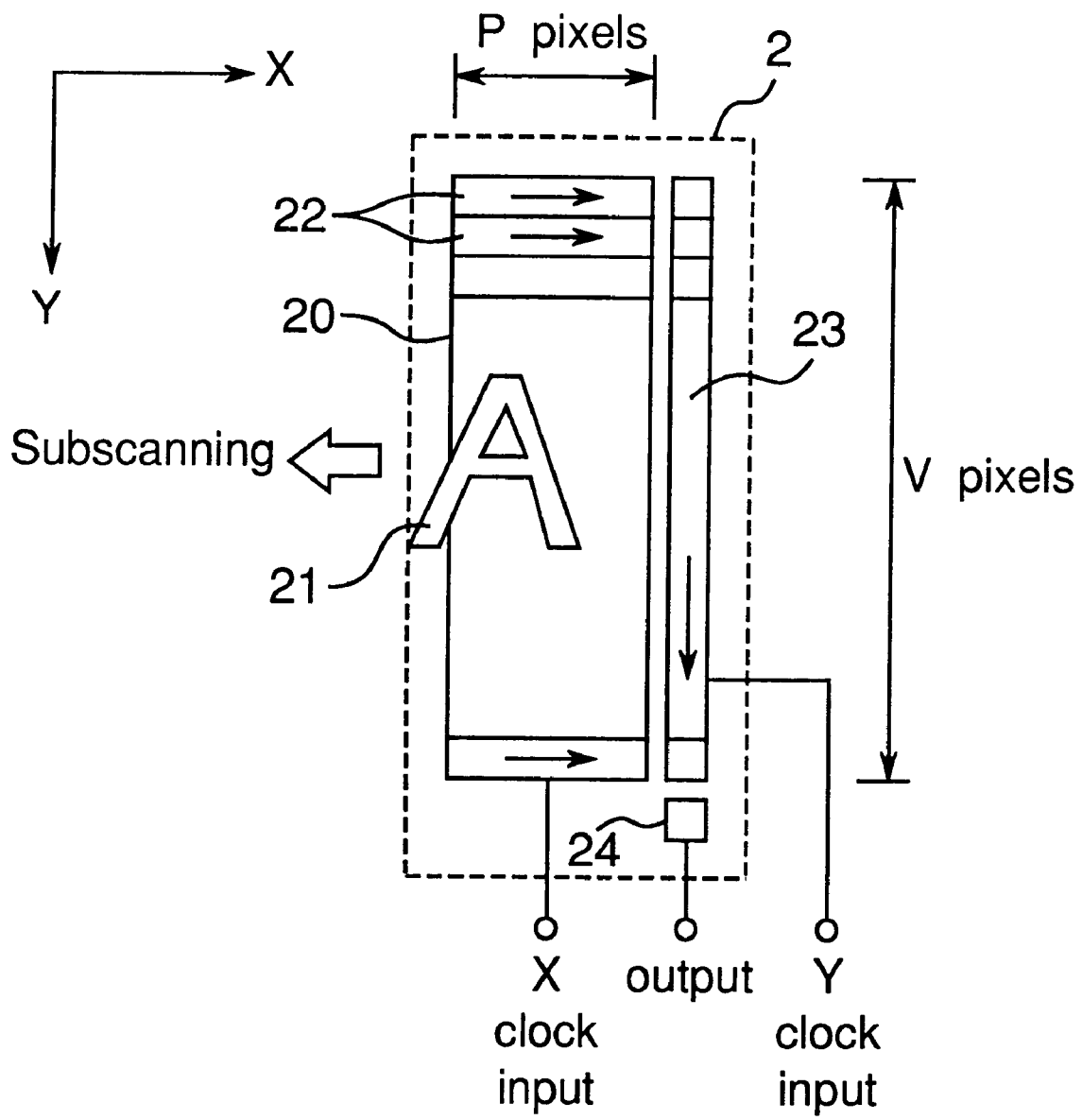
FIG. 2 is a diagram showing the imaging device of the invention and is used to describe the basic operation thereof.

FIG. 2 shows the imaging device 2 and is used to describe the TDI operation thereof. As shown in FIG. 2 the imaging device 2 comprises a receptor 20 comprising a V-row X register 22, a Y register 23 for serially outputting the signal charges collected in parallel at the X end of the X register 22, and an output circuit 24 for converting the collected signal charges to voltage values. Each X register 22 has P pixels aligned horizontally. There are V rows of X register 22. Thus, the receptor 20 includes P×V pixels. According to one preferred embodiment, P=384 and V=1080. From a different viewpoint, it can be said that there are P columns of pixels, each column including V pixels aligned vertically. The number of pixels aligned vertically in the Y register 23 is also V. Photoelectric conversion is accomplished by the X register 22, and the elements other than the receptor 20 are shielded from light.

The subject image 21, such as letter "A" formed by the lens system 1 shown in FIG. 1, is still relative to the camera chassis 3, and is therefore moving in direction X as seen from the imaging device 2 when the imaging device 2 subscans in the opposite-X direction. Therefore, if X registers 22 are transferred in the opposite direction at the same speed as the movement, i.e., the subscanning, of the image 21, sensitivity corresponding to the pixel count P in the X direction is obtained as a result of TDI operation.

Figure 3:
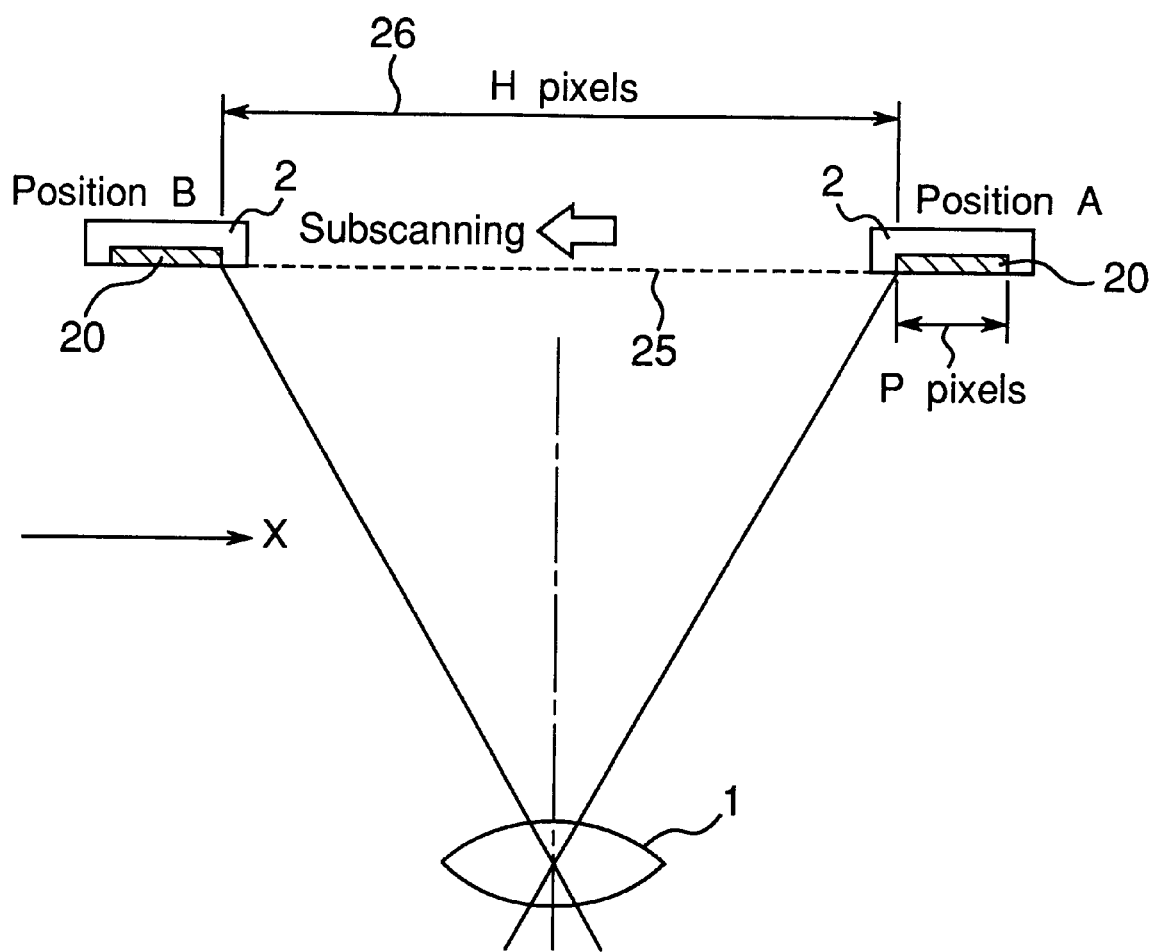
FIG. 3 is a diagram showing the basic subscanning operation of the invention.

The subscanning operation is shown in FIG. 3 in a cross section through the X axis. An H pixel wide image area 26 is defined on the imaging plane 25 of the lens system 1. This image area 26 corresponds to the effective output signal area of the camera. Position A at which the leading edge of the P pixel wide receptor 20 of the imaging device 2 meets the image area 26 is the imaging start position, and position B at which the trailing edge of the receptor 20 leaves the image area 26 is the imaging end position.

Starting from position A, the imaging device 2 subscans leftwardly in FIG. 3.

When the imaging device 2 is subscanned for one pixel width distance, the pixels in the first column will carry cumulated charges resulting from one unit time exposure.

When the imaging device 2 is subscanned for another one pixel width distance, all the charges cumulated in the first column pixels are shifted or transferred in the scan direction X by one pixel width distance, i.e., to the second column pixels. The pixels in the first column will carry cumulated charges resulting from one unit time exposure, and the pixels in the second column will carry cumulated charges resulting from two unit time exposure.

When the imaging device 2 is subscanned for yet another one pixel width distance (i.e., three pixel width distance from the start), all the charges cumulated in the first and second column pixels are transferred in the scan direction X by one pixel width distance, i.e., respectively, to the second and third column pixels. The pixels in the first column will carry cumulated charges resulting from one unit time exposure, the pixels in the second column will carry cumulated charges resulting from two unit time exposure, and the pixels in the third column will carry cumulated charges resulting from three unit time exposure.

In this manner, when the imaging device 2 is subscanned for P pixel width distance from the start, the charges in the (P−1)th column are transferred to the Pth column, those in the (P−2)th column are transferred to the (P−1)th column, those in the (P−3)th column are transferred to the (P−3)th column, and so on. Thus, the pixels in the first column will carry cumulated charges resulting from one unit time exposure, the pixels in the second column will carry cumulated charges resulting from two unit time exposure, . . . , the pixels in the (P−1)th column will carry cumulated charges resulting from (P−1) unit time exposure, and the pixels in the Pth column will carry cumulated charges resulting from P unit time exposure.

Then, when the imaging device 2 is subscanned for (P+1) pixel width distance from the start, the charges in the Pth column, representing the image data in the first column in the imaging plane 3a, are shifted to Y register 23, and all the remaining charges are transferred in the scan direction X by one pixel width distance. Since there will be no exposure being done in the Y register 23, the charges shifted to Y register 23 are resulted from P unit time exposure.

Thereafter, when the imaging device 2 is subscanned for (H+P) pixel width distance from the start, i.e., to the position B shown in FIG. 3, the charges in the Pth column, representing the image data of the last column in the imaging plane 3a, are shifted to Y register 23.

As will be explained in detail later, since the subscanning speed of the imaging device 2 in the opposite-X direction, and the transferring speed of the charges in the X direction are the same, the charges are being cumulated in the same positional column within the imaging plane 3a with the same exposure time (P unit time).

The imaging device 2 is thus driven by the scanning device 4 at a constant speed D in the opposite-X direction to subscan the imaging plane 3a from at least position A to position B. Also, the imaging device 2 is driven by drive clocks produced from X clock generator 5 so that the charges are transferred at the same constant speed D in the X direction from one side of the imaging device 2 to the opposite side thereof.

Figure 11:
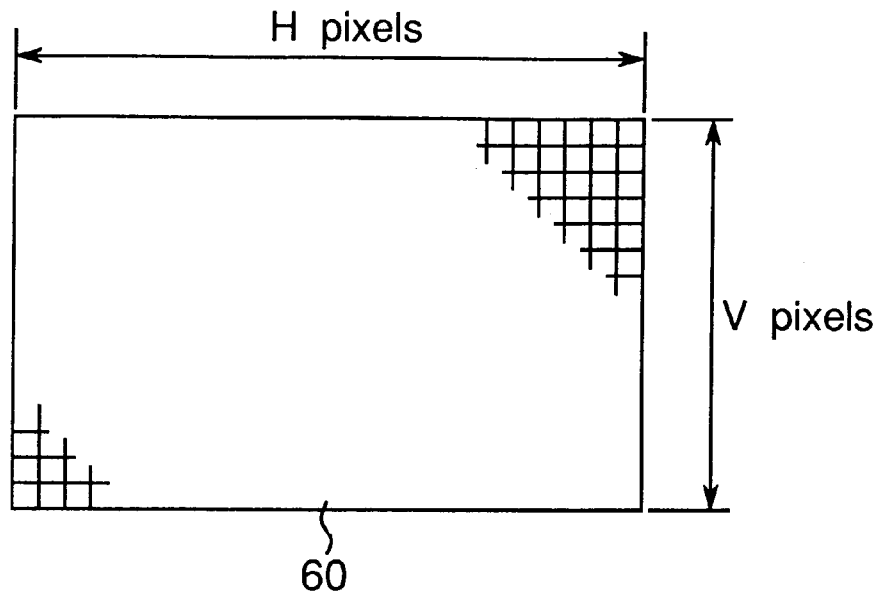
FIG. 11 is a diagram showing a conventional area sensor.
Figure 12:
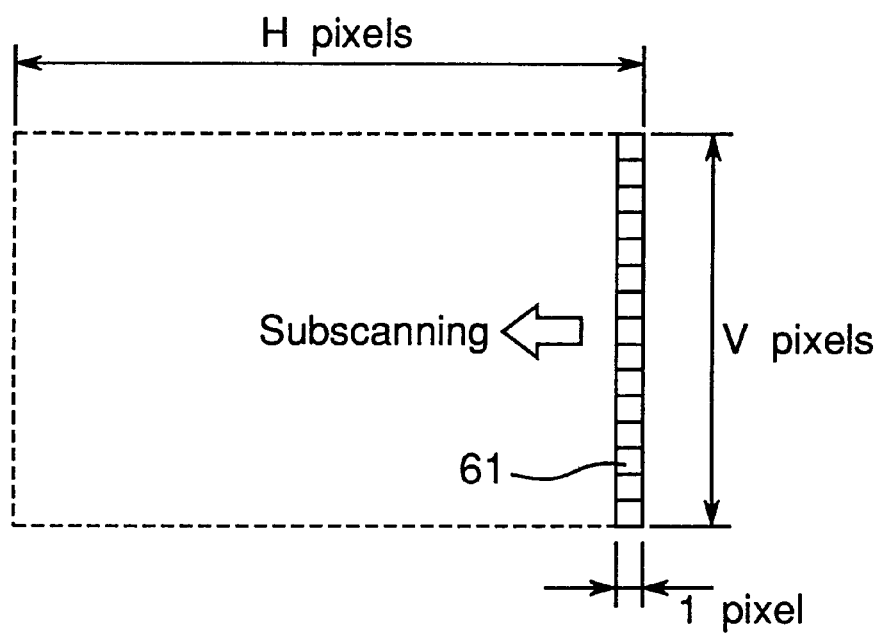
FIG. 12 is a diagram showing a two-dimensional imaging operation using a conventional line sensor.
Figure 13:
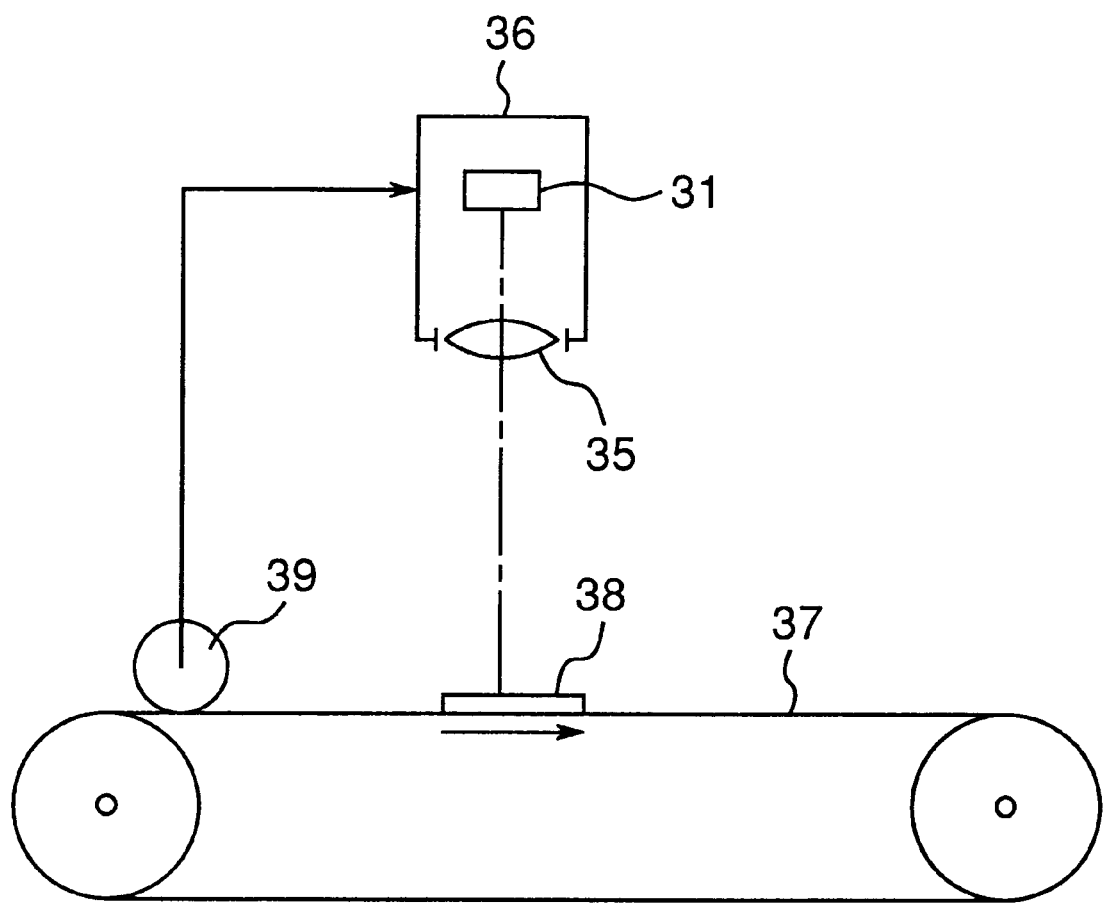
FIG. 13 is a diagram showing the configuration of a conventional apparatus using a TDI operation.

The imaging device 2 with a P pixel wide receptor compares favorably with the full area sensor having an H pixel wide receptor 60 such as shown in FIG. 11. Specifically, if the per-pixel sensitivity of both imaging devices 60 and 2 is the same, the per-pixel charge storage time will be the same and the same output signal voltage will be obtained if the sensor having an H pixel wide receptor subscans at a rate equal to (H+P)/P times the exposure time of the full area sensor.

The characteristics of an electronic camera having a 1920 pixel (H) by 1080 pixel (V) image area are described below. The reference characteristics against which this electronic camera is compared are obtained from a 1/60 sec./frame progressive scan HDTV camera that uses a full area sensor. The sensitivity of the imaging device 2 of the electronic camera is equal to the per-pixel sensitivity of the full area sensor of the HDTV camera. The receptor 20 of the electronic camera measures 384 pixels (H) by 1080 pixel (V), and the subscanning speed can be freely set. The maximum sensitivity of the HDTV camera is obtained when the charge storage time is 1/60 second. Based on the above equation (H+P)/P and the widths of H=1920 and P=384, (H+P)/P=6 is obtained. Thus, the exposure time 1/60 second using the full area imaging device 60 is comparable to the exposure time 1/10 second (=1/60×6) using the imaging device 2.

It should be noted that a 1/10 second shutter speed with a conventional silver halide film camera will produce noticeable image blurring due to hand movement during hand-held exposures. However, the subscanning time of the electronic camera of the present embodiment does not correspond to the lens shutter speed. The equivalent shutter speed, i.e., per-pixel exposure time (charge storage time), when the subscanning speed is 1/10 second is 1/60 second, a speed at which there is minimal blurring due to hand movement and which is fast enough for practical hand-held photography.

Blurring due to subject movement during the subscanning time is also relative to the exposure time and is therefore not a particular problem.

It should also be noted that the above operation applies when recording the darkest subjects that can be captured by a TV camera. As the subject brightness increases the required charge storage time of the typical TV camera sensor decreases with the electronic shutter, which controls the charge storage time, operating at 1/120 second, 1/240 second, or faster. This means that the subscanning time of the electronic camera of the invention also decreases to 1/20 second, 1/40 second, and faster. As the subscanning time decreases, so do the effects of hand movement and subject movement. The electronic shutter of the imaging device 2 is used above the upper limit of the subscanning speed.

The total pixel count of the imaging device 2 in the electronic camera of the present embodiment is approximately 410,000, or approximately 1/5 the pixel count of the above-noted full area sensor. The imaging device 2 can therefore be achieved with a smaller chip. The smaller chip area and resulting yield improvements combine to significantly reduce the cost of the imaging device, and it is therefore possible to construct a low cost, high resolution electronic camera.

Referring to FIG. 4, a block diagram of a scanning device 4 using a synchronous motor is shown. The scanning device 4 comprises the motor 43 that is synchronously driven by the control circuit 42 based on the subscanning clock 41, and the slide mechanism 44 having a support 8 on which the imaging device 2 is mounted. Motor 43 provides driving power so that the imaging device 2 is transported in opposite-X direction at a constant speed D.

The motor 43 may be a stepping motor or other motor that operates at a rotational or linear speed determined by the drive frequency, or a motor that is synchronously controlled by the control circuit 42. Thus, the imaging device 2 is moved in the opposite-X direction at the subscanning speed D. The subscanning speed D of the slide mechanism 44 is synchronized to the subscanning clock 41. The X drive clock for transferring the charges in the imaging device 2 in X direction at the speed D is generated by the X clock generator 5, which is also based on the subscanning clock 41. As a result the subscanning speed D and the charge transfer speed D in the X register 22 of the imaging device 2 are controlled to the same speed, but in opposite direction. Thus, TDI operation can therefore be achieved.

Referring to FIG. 5, a modification of a scanning device 4 is shown. The scanning device 4 additionally comprises a position detector 45 for detecting the position of the imaging device 2 along the slide mechanism 44. The motor 43 is controlled by the control circuit 42 based on the subscanning clock 41 and referenced to the output from the position detector 45 to transport the scanning device 4 at a constant speed through the subscanning area. The X clock of the imaging device 2 is generated by the X clock generator 5 based on the output pulse from the position detector 45. As a result, the subscanning speed D and the transfer speed D of the X register 22 of the imaging device 2 can be controlled to the same speed, and stable TDI operation can be achieved even if there is a slight variation in the subscanning speed.

According to the scanning device 4 of FIG. 4, since there is no position detector 45, the position of the imaging device 2 is controlled by the number of drive pulses supplied to the stepping motor 43. Thus, the scanning device 4 of FIG. 4 required a precise control of the drive pulse applied to the stepping motor, as well as the precise movement of the stepping motor.

However, according to the scanning device 4 of FIG. 5, since position detector 45 is provided, motor 43 can be a DC motor with the drive signal being a DC current. In this case the motor is not required to have as precise movement as the stepping motor. When the motor speed should vary, as detected by the control circuit 42, the charge transferring speed is also varied so as to keep charging the same location within the imaging plane 3a. In this manner stable TDI operation can be achieved even if there is a slight variation in the subscanning speed D.

Figure 6A:
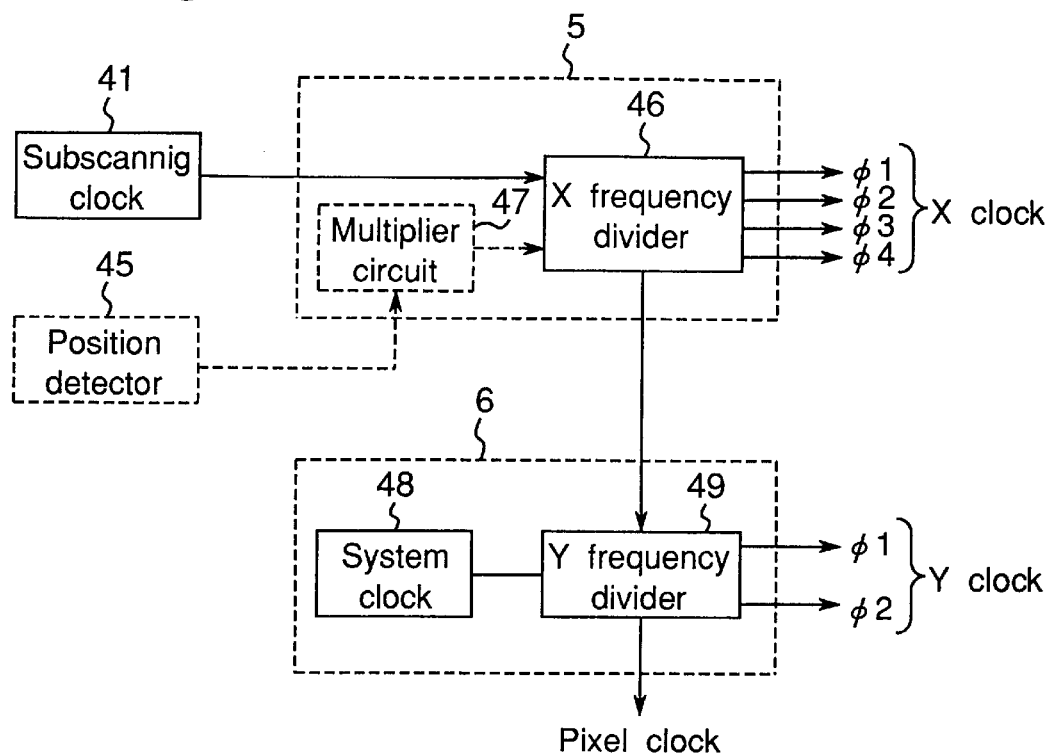
FIG. 6A is a block diagram of the clock generator in one embodiment of the invention.

Referring to FIG. 6A, a block diagram of the X clock generator 5 and the Y clock generator 6 is shown. The four-phase X clocks $\phi 1$, $\phi 2$, $\phi 3$, $\phi 4$ supplied to the imaging device 2 are obtained by an X frequency divider 46 of the X clock generator 5. Four overlapping pulses of the four-phase X clocks $\phi 1$, $\phi 2$, $\phi 3$, $\phi 4$ are used to transfer or shift the charge in the X direction by one pixel pitch. The X frequency divider 46 devices the frequency of the subscanning clock 41 or the output pulse from the position detector 45.

Figure 6B:
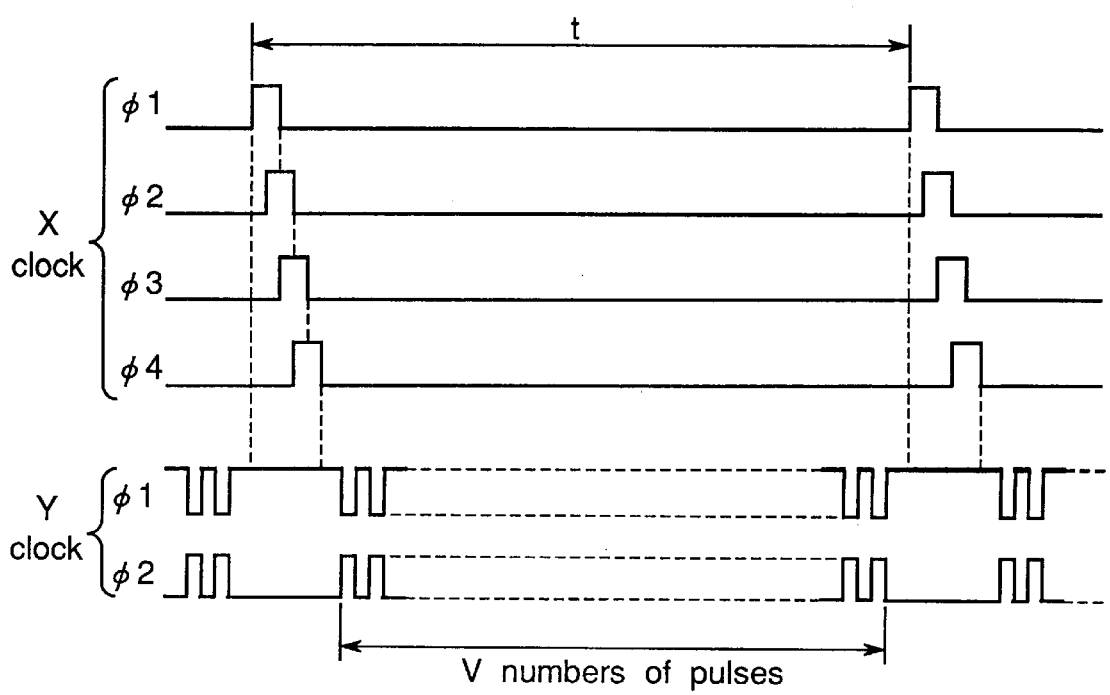
FIG. 6B is a wave form showing an X clock and a Y clock.

The four phase X clocks $\phi 1$, $\phi 2$, $\phi 3$, $\phi 4$ are shown in FIG. 6B. When the electrode pitch or pixel pitch of the X register 22 of the imaging device 2 is R (meter) and the subscanning speed is D (meter/sec), the pulse repetition period t (sec) can be given by t=R/D. According to one embodiment, R=10 ($\mu$m) and D=1 (meter/sec), t=10 ($\mu$s).

If the position detection pitch of the position detector 45 is coarser than the electrode pitch or pixel pitch of the X register 22 of the imaging device 2, the output pulse is frequency divided after multiplying by a multiplier circuit 47 which may have a PLL circuit. The position detection pitch is therefore an integral multiple of the electrode pitch or pixel pitch of the X register 22 of the imaging device 2.

The Y clock generator 6 generates two-phase Y clocks $\phi 1$ and $\phi 2$ by frequency dividing system clock 48 using Y frequency divider 49 so that the Y register 23 transfers V pixels during the time the X register 22 of the imaging device 2 transfers one pixel. The Y clock generator 6 also outputs a pixel clock to the image signal circuit 7.

The two-phase Y clocks $\phi 1$ and $\phi 2$ are also shown in FIG. 6B. Note that during one pulse repetition period t of the X clock, there are V pulses for transferring all the charges shifted to the Y register 23 to output circuit 24.

In the above embodiment, the imaging device 2 is arranged to take black and white images. Next, an arrangement for obtaining color images is described.

Figure 7:
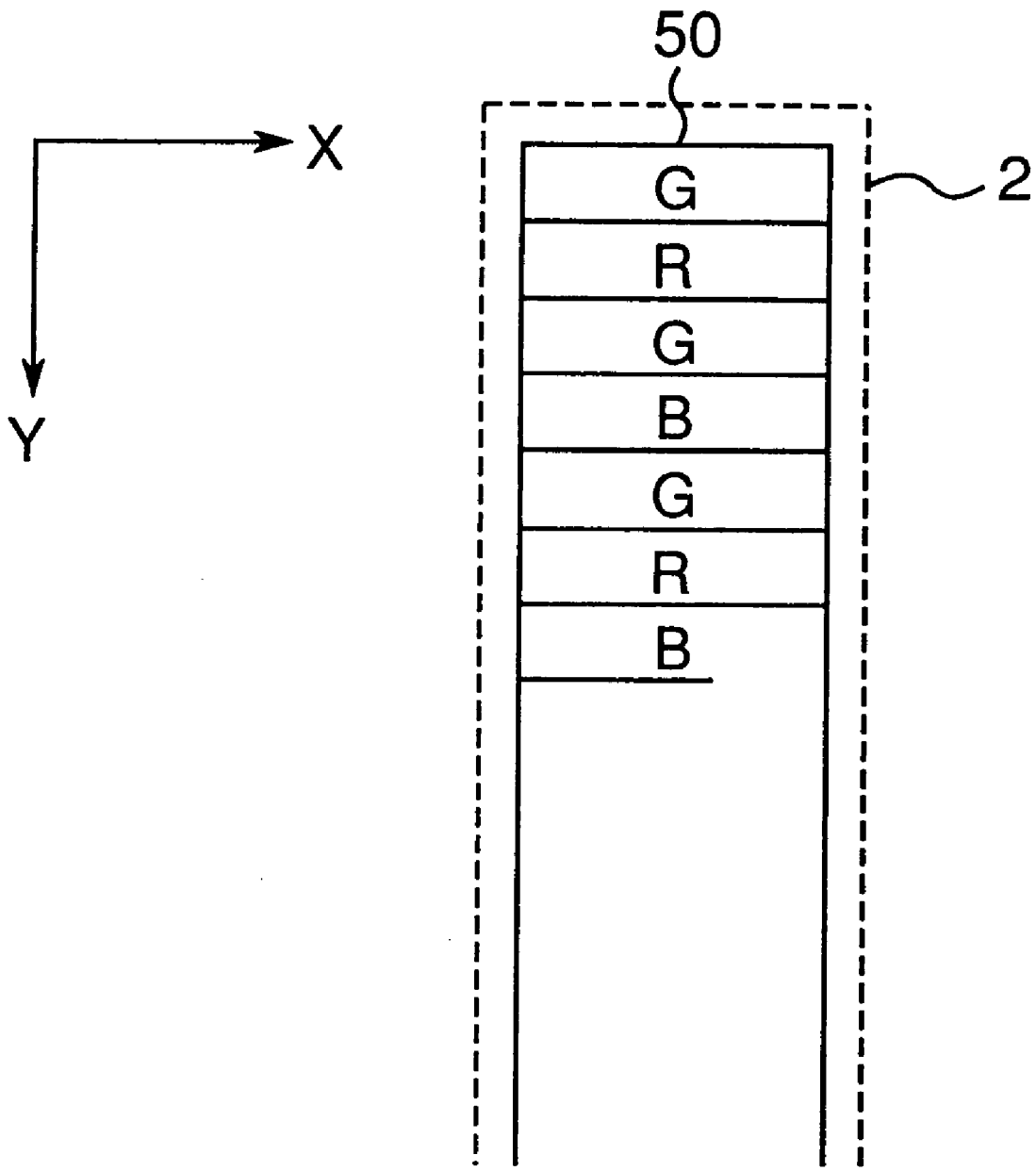
FIG. 7 is a diagram showing a color filter used in one embodiment of the invention.

Referring to FIG. 7, a color filter 50 having RGB (red, green and blue) color filter stripes is shown. The RGB color filter stripes are aligned with the X register 22 on the surface of the receptor 20 of the imaging device 2 shown in FIG. 2.

Note that the same color filter is used for the pixels aligned horizontally along one X register 22. By time-series processing the output from the color filter 50, the color signals obtained by TDI operation can be separated, thereby achieving a color image.

Figure 8A:
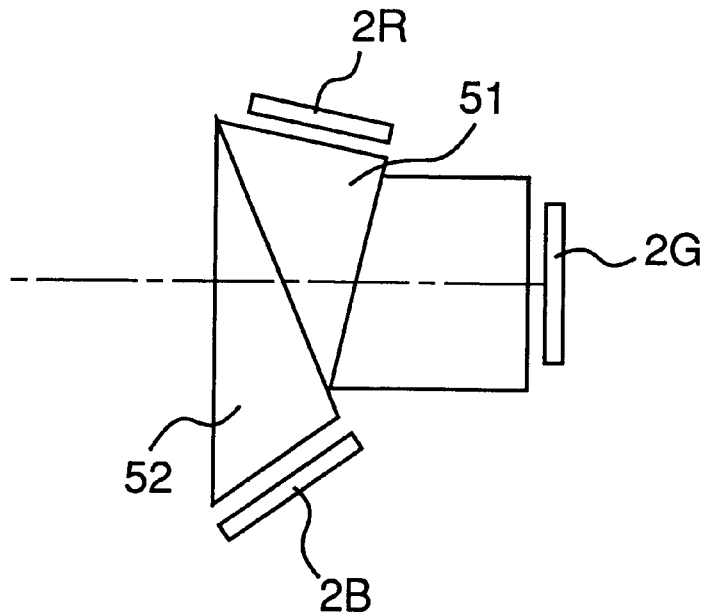
FIG. 8A is a diagram showing a color separation prisms used in one embodiment of the invention.

FIG. 8A shows an optical color separation system in which color separation prisms are used instead of the color filter. More specifically, imaging devices 2R, 2B and 2G are fixed in position to the R-selective prism 51, B-selective prism 52, and G-transmitting prism 53, respectively. Each prism 51, 52, 53 has a size so as to cover, not the full imaging plane, but only the imaging device. The optical color separation system shown in FIG. 8A is formed integrally and mounted on the support 8, and subscans the image with the scanning device 4. Because the width of the imaging device 2 in the X direction is narrower than that of a conventional area sensor, smaller prisms can be used to achieve this color separation system, and the camera can therefore be built smaller.

Figure 8B:
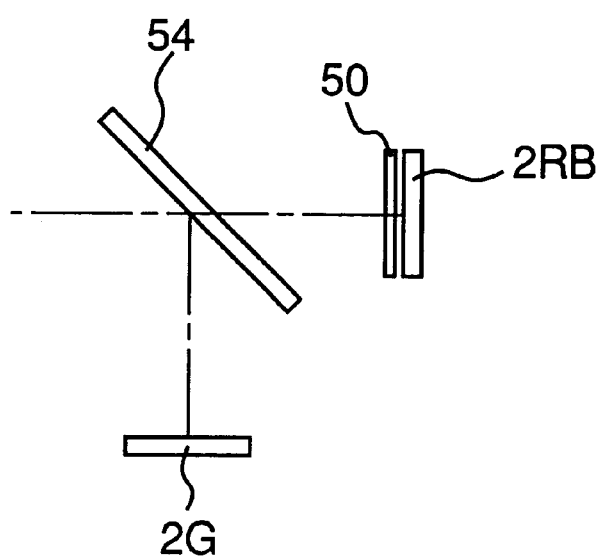
FIG. 8B is a diagram showing a color separation mirror used in another embodiment of the invention.

FIG. 8B shows another optical color separation system in which mirrors are used instead of the prisms. More specifically, a color separation mirror 54 reflects green light and has transparent characteristics with respect to red and blue lights. The reflected green lights are detected by imaging device 2G. The red and blue lights passed through the mirror 54 pass through red and blue stripe color filter 50 and are detected by imaging device 2RB.

It should be noted that the color imaging method of the invention can be achieved in various ways other than that described above depending upon the number of imaging devices used and the method of providing filters.

Figure 9:
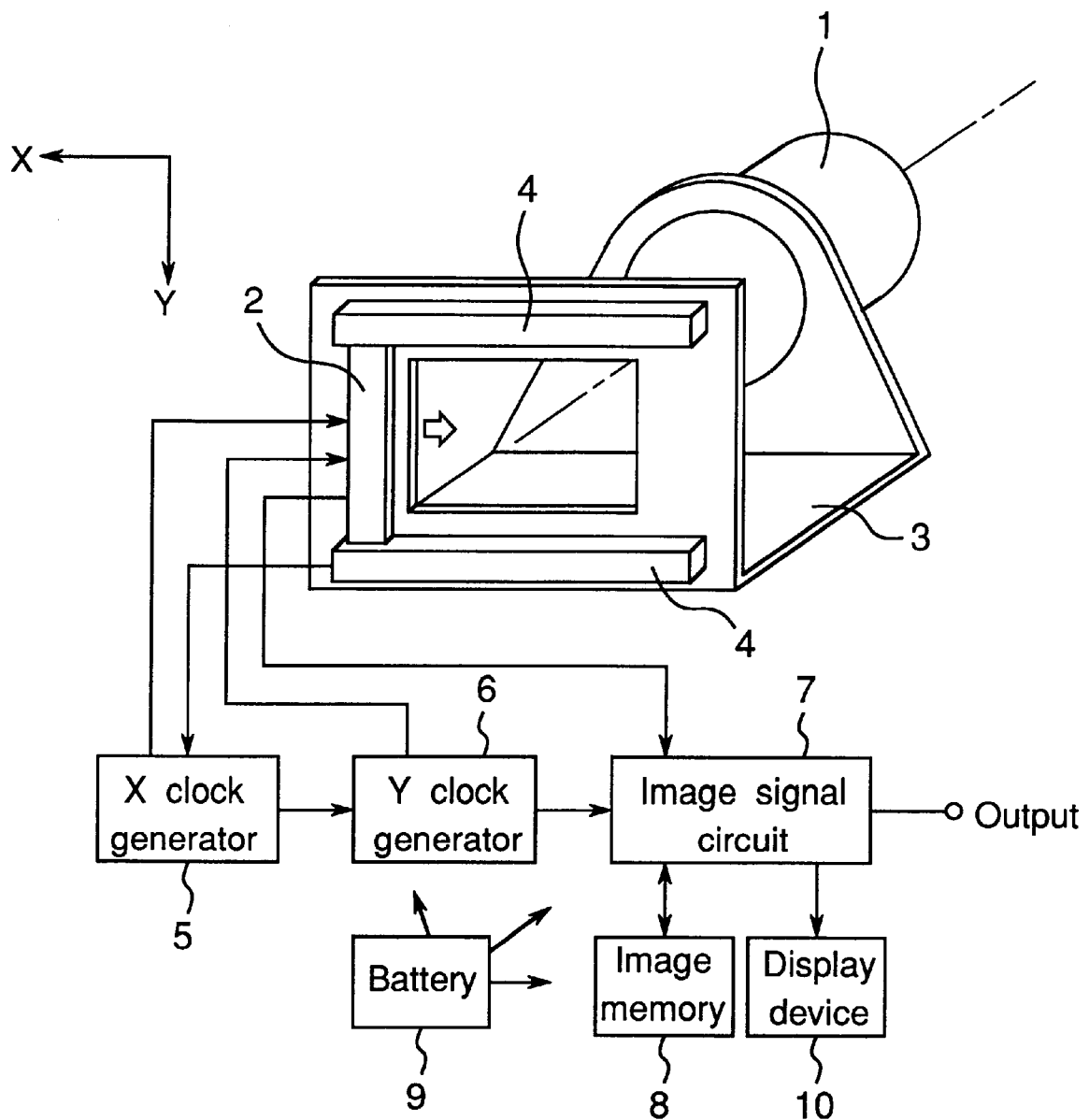
FIG. 9 is a basic configuration diagram of a still camera according to another embodiment of the invention.

Referring to FIG. 9, a modification of the electronic camera is shown. The electronic camera of the invention as shown in FIG. 1 is used connected to a video recording device in a manner similar to that of a conventional TV camera. The scanner-type electronic camera of the present embodiment as shown in FIG. 9, however, can be used as a stand-alone camera. This electronic camera is identical to that of the first embodiment in FIG. 1 from the lens system 1 to the image signal circuit 7.

The electronic camera of FIG. 9 differs from the first embodiment of FIG. 1 in having an image memory 8 and display device 10 connected to the image signal circuit 7 with camera power supplied from a battery 9. The image memory 8 can store plural imaged pictures, and the display device 10 is used to present the image signal on a display for viewing. The image memory 8, battery 9, and display device 10 are built in to the camera to enable portable, stand-alone use of the electronic camera.

Conventional camera-type scanners using a line sensor require a long exposure, time, as previously explained, and must therefore be used in a stationary position, and are thus not practical for use as a portable, stand-alone electronic camera. The ability to provide such a portable, stand-alone electronic camera is a major advantage of the present invention.

Referring to FIGS. 10A and 10B, a modification of the imaging device is shown. The imaging device 2 of a electronic camera according to FIG. 10A or 10B comprises the X register 22 and Y register 23 of the imaging device 2 as shown in FIG. 2, and an additional Y register 27 on the side of the X register 22 opposite that of the first Y register 23. Thus configured, images are captured by means of bidirectional subscanning as shown in FIGS. 10A and 10B.

The subscanning operation in FIG. 10A is identical to the subscanning operation shown in FIG. 2. During this subscanning operation the output port is switched to Y register 23, and the output from the second Y register 27 is not used. When subscanning in the opposite direction as shown in FIG. 10B, the phase of the X clock supplied to the X register 22 is inverted, the charge transfer direction is reversed, and the output port is switched to obtain output from the second Y register 27. While the right and left sides of the image are reversed in the output signals obtained from the two Y registers 23 and 27, this right-left side inversion can be corrected by appropriately addressing the memory when storing the image signal.

Constructing an electronic camera as described in connection with FIGS. 10A and 10B achieves a scanner-type electronic camera that is capable of imaging in both scanning directions, and is advantageous with respect to improving the continuous imaging speed and reducing power consumption.

It should be noted that all references to the two-dimensional axes X and Y in the above disclosure have been used for the convenience of explanation only. The directions of these axes are relative to each other, and the invention shall not be limited thereby.

As will be known from the preceding descriptions of the embodiments, the present invention provides an effective means of achieving a high resolution electronic camera enabling hand-held imaging of common, indeterminately moving subjects by means of low cost imaging devices having significantly fewer pixels than a common area sensor of comparable sensitivity.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electronic camera, comprising:

a lens system for forming an image of a subject, said lens system having an imaging plane which includes an imaging area;

a charge-transfer type two-dimensional imaging device, said imaging device having an imaging device receptor, and said imaging device receptor having a leading edge and a trailing edge;

a scanning means for subscanning said imaging device in a direction opposite to the x direction over the imaging plane of said lens system at a constant speed for at least a period from when said leading edge of said imaging device enters the imaging area of the imaging plane and when said trailing edge of said receptor leaves the imaging area;

an x clock generator for transferring photoelectric charges of said imaging device parallel to the x direction at the same speed as said imaging device is subscanned in the direction opposite to the x direction;

a y clock generator for serially transferring in the y direction the photoelectric charges collected at an x end of the imaging device to generate y direction output; and an image signal circuit for processing the y direction output of the imaging device.

2. The electronic camera of claim 1, wherein said scanning means comprises a motor that operates in synchronization with a subscanning clock, the x clock being generated from said subscanning clock.

3. The electronic camera of claim 1, wherein said scanning means comprises as position detector for detecting a scanning position of said imaging device, said position detector having an output pulse, and the x clock being generated in synchronization with the output pulse of said position detector.

4. The electronic camera of claim 3, wherein said scanning means comprises a motor that is controlled according to the output pulse of said position detector.

5. The electronic camera of claim 3, wherein said imaging device has an x-direction pixel pitch, and a position detection pitch of said position detector is an integral multiple of the x-direction pixel pitch of said imaging device.

6. The electronic camera of claim 1, wherein striped color filters of the same color are disposed in the x direction on the surface of said imaging device.

7. The electronic camera of claim 1, wherein said imaging device comprises a plurality of imaging devices, color separation prisms are disposed in front of said plurality of imaging devices, and said color separation prisms subscan integrally with said plurality of imaging devices.

8. The electronic camera of claim 1, wherein said imaging device comprises a plurality of imaging devices, color separation mirrors are disposed in front of said plurality of imaging devices, and said color separation mirrors subscan integrally with said plurality of imaging devices.

9. The electronic camera of claim 1, and further comprising a power supply battery and an image memory having plural image storage capacity built into said camera.

10. The electronic camera of claim 1, and further comprising a display device for displaying a recorded image signal built into said camera.

11. The electronic camera of claim 1, wherein two Y-direction charge-transfer registers are disposed at opposite sides of said imaging device in the x direction, enabling bi-directional imaging by switching the x-direction charge transfer direction and the subscanning direction of said scanning means.

12. A subscanning system for an electronic camera in which a lens system of the camera forms an image of a subject, the lens system having an imaging plane which includes an imaging area, said subscanning system comprising:
   a charge-transfer type two-dimensional imaging device, said imaging device having an imaging device receptor, and said imaging device receptor having a leading edge and a trailing edge;
   a scanning means for subscanning said imaging device in a direction opposite to the x direction over the imaging plane at a constant speed for at least a period from when said leading edge of said imaging device enters the imaging area of the imaging plane and when said trailing edge of said receptor leaves the imaging area;
   an x clock generator for transferring photoelectric charges of said imaging device parallel to the x direction at the same speed as said imaging device is subscanned in the direction opposite to the x direction;
   a y clock generator for serially transferring in the y direction the photoelectric charges collected at an x end of the imaging device to generate y direction output; and an image signal circuit for processing the y direction output of the imaging device.

13. The subscanning system for an electronic camera of claim 12, wherein said scanning means comprises a motor that operates in synchronization with a subscanning clock, the x clock being generated from said subscanning clock.

14. The subscanning system for an electronic camera of claim 12, wherein said scanning means comprises as position detector for detecting a scanning position of said imaging device, said position detector having an output pulse, and the x clock being generated in synchronization with the output pulse of said position detector.

15. The subscanning system for an electronic camera of claim 14, wherein said scanning means comprises a motor that is controlled according to the output pulse of said position detector.

16. The subscanning system for an electronic camera of claim 14, wherein said imaging device has an x-direction pixel pitch, and a position detection pitch of said position detector is an integral multiple of the x-direction pixel pitch of said imaging device.

17. The subscanning system for an electronic camera of claim 12, wherein striped color filters of the same color are disposed in the x direction on the surface of said imaging device.

18. The subscanning system for an electronic camera of claim 12, wherein said imaging device comprises a plurality of imaging devices, color separation prisms are disposed in front of said plurality of imaging devices, and said color separation prisms subscan integrally with said plurality of imaging devices.

19. The subscanning system for an electronic camera of claim 12, wherein said imaging device comprises a plurality of imaging devices, color separation mirrors are disposed in front of said plurality of imaging devices, and said color separation mirrors subscan integrally with said plurality of imaging devices.

20. The subscanning system for an electronic camera of claim 1, and further comprising a power supply battery and an image memory having plural image storage capacity built into said camera.

21. The subscanning system for an electronic camera of claim 1, and further comprising a display device for displaying a recorded image signal built into said camera.

22. The subscanning system for an electronic camera of claim 1, wherein two Y-direction charge-transfer registers are disposed at opposite sides of said imaging device in the x direction, enabling bi-directional imaging by switching the x-direction charge transfer direction and the subscanning direction of said scanning means.

23. An electronic camera, comprising:
   a lens system for forming an image of a subject, said lens system having an imaging plane which includes an imaging area;
   a charge-transfer type two-dimensional imaging device, said imaging device having an imaging device receptor, and said imaging device receptor having a leading edge and a trailing edge;
   a scanning means for subscanning said imaging device in a direction opposite to the x direction over the imaging plane of said lens system at a constant speed for at least a period from when said leading edge of said imaging device enters the imaging area of the imaging plane and when said trailing edge of said receptor leaves the imaging area;
   an x clock generating means for generating an x clock so as to transfer photoelectric charges of said imaging device parallel to the x direction at the same speed as said imaging device is subscanned in the direction opposite to the x direction;
   a y clock generating means for generating a y clock so as to serially transfer in the y direction the photoelectric charges collected at an x end of the imaging device to generate y direction output; and an image signal circuit for processing the y direction output of the imaging device.

24. The electronic camera of claim 23, wherein said scanning means comprises a motor that operates in synchronization with a subscanning clock, the x clock being generated from said subscanning clock.

25. The electronic camera of claim 23, wherein said scanning means comprises a position detector for detecting a scanning position of said imaging device, said position detector having an output pulse, and the x clock being generated in synchronization with the output pulse of said position detector.

26. The electronic camera of claim 25, wherein said scanning means comprises a motor that is controlled according to the output pulse of said position detector.

27. The electronic camera of claim 25, wherein said imaging device has an x-direction pixel pitch, and a position detection pitch of said position detector is an integral multiple of the x-direction pixel pitch of said imaging device.

28. The electronic camera of claim 23, wherein striped color filters of the same color are disposed in the x direction on the surface of said imaging device.

29. The electronic camera of claim 23, wherein said imaging device comprises a plurality of imaging devices, color separation prisms are disposed in front of said plurality of imaging devices, and said color separation prisms subscan integrally with said plurality of imaging devices.

30. The electronic camera of claim 23, wherein said imaging device comprises a plurality of imaging devices, color separation mirrors are disposed in front of said plurality of imaging devices, and said color separation mirrors subscan integrally with said plurality of imaging devices.

31. The electronic camera of claim 23, and further comprising a power supply battery and an image memory having plural image storage capacity built into said camera.

32. The electronic camera of claim 23, and further comprising a display device for displaying a recorded image signal built into said camera.

33. The electronic camera of claim 23, wherein two Y-direction charge-transfer registers are disposed at opposite sides of said imaging device in the x direction, enabling bi-directional imaging by switching the x-direction charge transfer direction and the subscanning direction of said scanning means.

34. An electronic camera, comprising:

a lens system for forming an image of a subject, said lens system having an imaging plane which includes an imaging area;

a charge-transfer imaging device comprising a two-dimensional image receptor having v-rows of x registers and a y register for serially outputting signal charges collected in parallel at an x end of said x register in an x direction, and said imaging device receptor having a leading edge and a trailing edge;

a scanner having said imaging device mounted thereto for subscanning said imaging device in a direction opposite to the x direction over the imaging plane of said lens system at a constant speed for at least a period from when said leading edge of said imaging device enters the imaging area of the imaging plane and when said trailing edge of said receptor leaves the imaging area;

an x clock generator connected with an x clock input of said imaging device for transferring photoelectric charges of said imaging device in the v-rows of the x registers parallel to the x direction at the same speed as said imaging device is subscanned in the direction opposite to the x direction;

a y clock generator connected with a y clock input of said imaging device for serially transferring in the y direction photoelectric charges collected at x end of the imaging device in the y register to generate y direction output; and an image signal circuit having an input connected to the y register of said imaging device for processing the y direction output from the y register.

* * * * *

UNITED STATES PATENT AND TRADEMARK OFFICE
CERTIFICATE OF CORRECTION

PATENT NO. : 6,005,617  
DATED : December 21, 1999  
INVENTOR(S) : Shimamoto et al.

Page 1 of 1

It is certified that error appears in the above-identified patent and that said Letters Patent is hereby corrected as shown below:

Title page,
Item [56] References Cited, by adding the following U.S. PATENT DOCUMENTS,

| | | |
|---|---|---|
| -- 5,416,609 | 5/1995 | Matsuda et al. |
| 4,740,681 | 4/1988 | Tsuno |
| 4,922,337 | 5/1990 | Hunt et al. |
| 4,264,921 | 4/1981 | Pennington et al. |
| 5,101,266 | 3/1992 | Schlig et al. -- |

Also add the following FOREIGN PATENT DOCUMENTS,

| | | |
|---|---|---|
| -- 6-18968 | 1/1994 | Japanese Patent Office |
| 4-235455 | 8/1992 | Japanese Patent Office |
| 5-316302 | 11/1993 | Japanese Patent Office -- |

Signed and Sealed this

Nineteenth Day of February, 2002

Attest:

JAMES E. ROGAN  
*Attesting Officer*  *Director of the United States Patent and Trademark Office*